(12) United States Patent
Stojkovic et al.

(10) Patent No.: US 10,562,485 B2
(45) Date of Patent: Feb. 18, 2020

(54) REMOVABLE SEATBELT POST FOR A VEHICLE HAVING A REMOVABLE ROOF

(71) Applicant: Ford Global Technologies, LLC, Dearborn, MI (US)

(72) Inventors: Dragan B. Stojkovic, Taylor, MI (US); Stephen Thomas Kozak, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 15/950,490

(22) Filed: Apr. 11, 2018

(65) Prior Publication Data
US 2019/0315309 A1 Oct. 17, 2019

(51) Int. Cl.
*B60R 22/20* (2006.01)
*B60J 7/10* (2006.01)
*B60R 22/24* (2006.01)

(52) U.S. Cl.
CPC .............. *B60R 22/20* (2013.01); *B60J 7/106* (2013.01); *B60R 22/24* (2013.01)

(58) Field of Classification Search
CPC ......... B60R 22/20; B60R 22/24; B60R 22/18; B60J 7/106; B60J 7/10; B62D 25/04
See application file for complete search history.

(56) References Cited

U.S. PATENT DOCUMENTS

| | | | |
|---|---|---|---|
| 4,863,190 A | 9/1989 | Tokarz et al. | |
| 5,098,162 A * | 3/1992 | Forget | B60R 22/22 297/482 |
| 5,671,948 A * | 9/1997 | Susko | B60N 2/3047 280/801.1 |
| 8,985,632 B1 | 3/2015 | Heckman et al. | |
| 2002/0136623 A1* | 9/2002 | Bauers | A61G 3/0808 414/537 |
| 2003/0116955 A1 | 6/2003 | Adin et al. | |
| 2005/0186056 A1* | 8/2005 | Logan | B60P 1/4442 414/540 |
| 2008/0018088 A1 | 1/2008 | Gray | |

FOREIGN PATENT DOCUMENTS

| | | |
|---|---|---|
| DE | 102012105389 B3 | 9/2013 |
| FR | 2930499 A1 | 10/2009 |
| KR | 100235489 B1 | 12/1995 |

\* cited by examiner

*Primary Examiner* — Drew J Brown
(74) *Attorney, Agent, or Firm* — Vichit Chea; Brooks Kushman, P.C.

(57) ABSTRACT

A vehicle includes a body, a removable roof, and a removable seatbelt post. The body has a pillar that includes a pillar receptacle. The removable roof has a roof pillar adapted to be received within the pillar receptacle and removably fastened to the pillar in a first configuration. The removable seatbelt post includes a first portion having a seatbelt ring. The removable seatbelt post further includes a second portion adapted to be received within the pillar receptacle and removably fastened to the pillar in a second configuration.

20 Claims, 4 Drawing Sheets

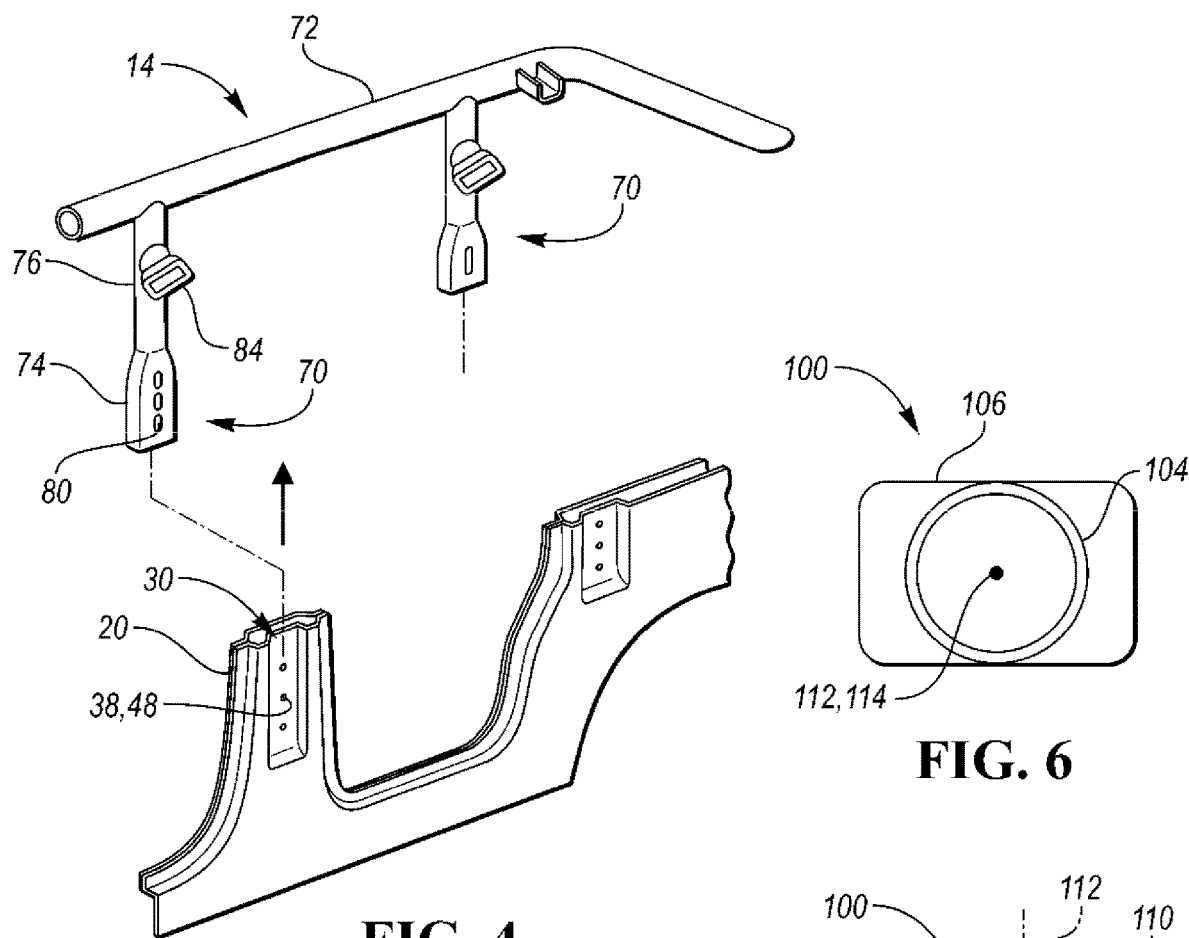
FIG. 4
FIG. 6
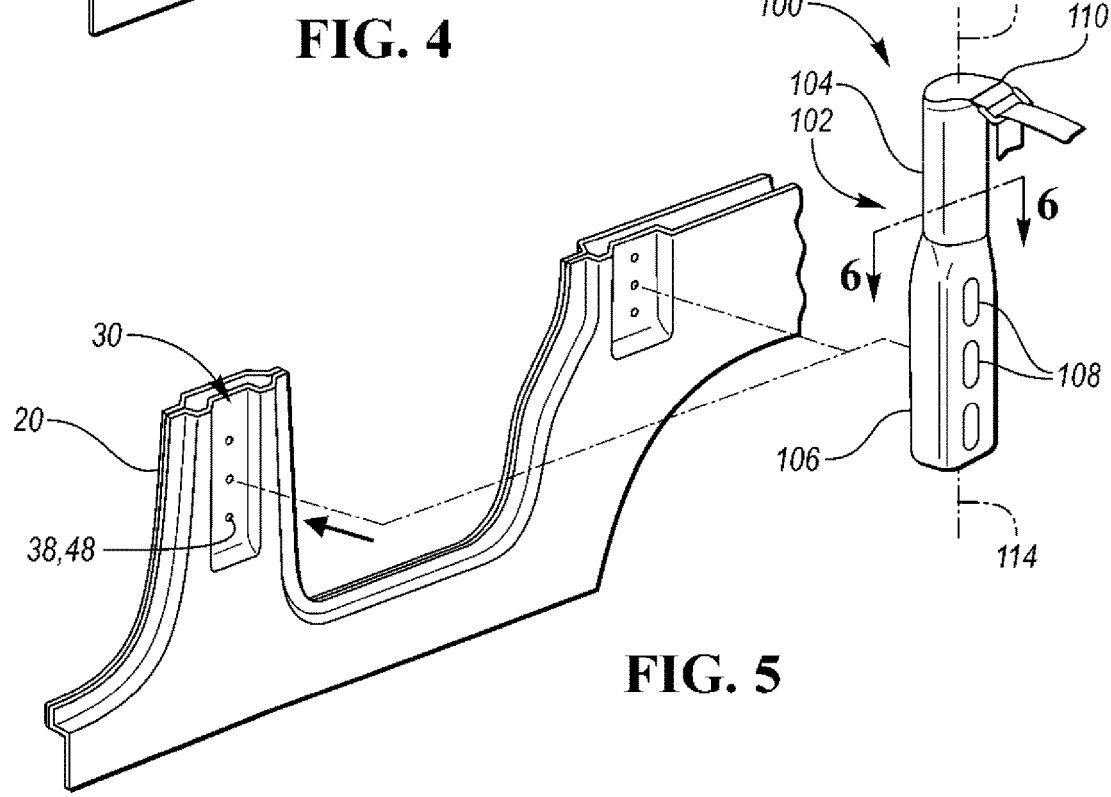
FIG. 5

US 10,562,485 B2

REMOVABLE SEATBELT POST FOR A VEHICLE HAVING A REMOVABLE ROOF

TECHNICAL FIELD

This disclosure relates to vehicles having a roof formed by removable posts that may be outfitted with a removable seat belt post.

BACKGROUND

Sport utility vehicles may be equipped with a removable roof that functions to cover the passenger compartment and may also be removed to provide an open-air driving experience. Removable roofs may be one-piece shells, or may have panels made of textile materials or rigid panels that are attached to roof rails and roof bows.

SUMMARY

In at least one approach, a vehicle is provided. The vehicle may include a body having a pillar that includes a pillar receptacle. The vehicle may further include a removable roof having a roof pillar adapted to be received within the pillar receptacle and removably fastened to the pillar in a first configuration. The vehicle may further include a removable seatbelt post including a first portion having a seatbelt ring. The removable seatbelt post may further include a second portion adapted to be received within the pillar receptacle and removably fastened to the pillar in a second configuration.

In at least one approach, a removable seatbelt post is provided. The removable seatbelt post may include a first portion, a second portion, and a third portion. The first portion may define a first central axis and including a seatbelt ring. The second portion may extend from the first portion and may define a second central axis coaxial with the first central axis. The second portion may include vertically aligned apertures. The third portion may extend from the second portion and may define a third central axis that extends at an oblique angle to the second central axis. The third portion may include a mounting bracket secured thereto.

In at least one approach, a removable seatbelt post is provided. The removable seatbelt post may include a vertical body portion, a seatbelt ring pivotably secured to the vertical body portion, a brace portion, and a mounting bracket secured to an end of the brace portion. The vertical body portion may define a plurality of apertures aligned along a vertical axis. The brace portion may extend from the vertical body portion at an oblique angle to the vertical axis. The mounting bracket may extend in a plane generally orthogonal to the vertical axis.

In at least one approach, a method of converting a vehicle is provided. The method may include detaching a seatbelt ring from a roof pillar of a removable roof, and detaching the removable roof from a body pillar of a vehicle body structure. The method may further include securing a vertically-extending seatbelt post to the body pillar, and securing the seatbelt ring to the seatbelt post.

BRIEF DESCRIPTION OF THE DRAWINGS

FIG. 4 is a partially exploded view of a vehicle that may be assembled in a first configuration.

FIG. 5 is a partially exploded view of a vehicle that may be assembled in a second configuration.

FIG. 6 is a cross-sectional plan view of a removable seatbelt post.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
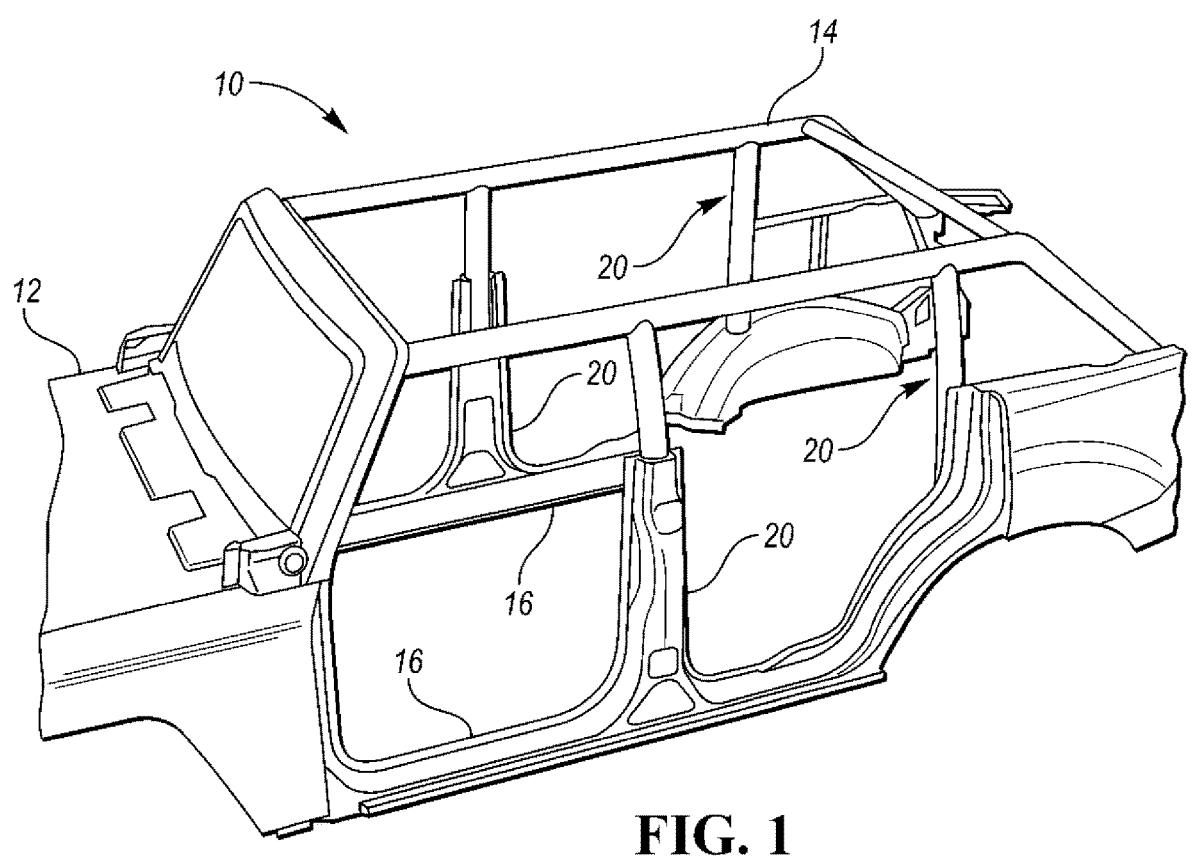
FIG. 1 is perspective view of a vehicle.

Referring now to FIG. 1, a vehicle 10 is provided. The vehicle 10 may include a frame assembly that includes a body 12 and a roof 14. The body 12 may include opposing side panels 16. The side panels 16 may include or define one or more pillars 20, such as a hinge pillar, a B-pillar, and a C-pillar.

Figure 2:
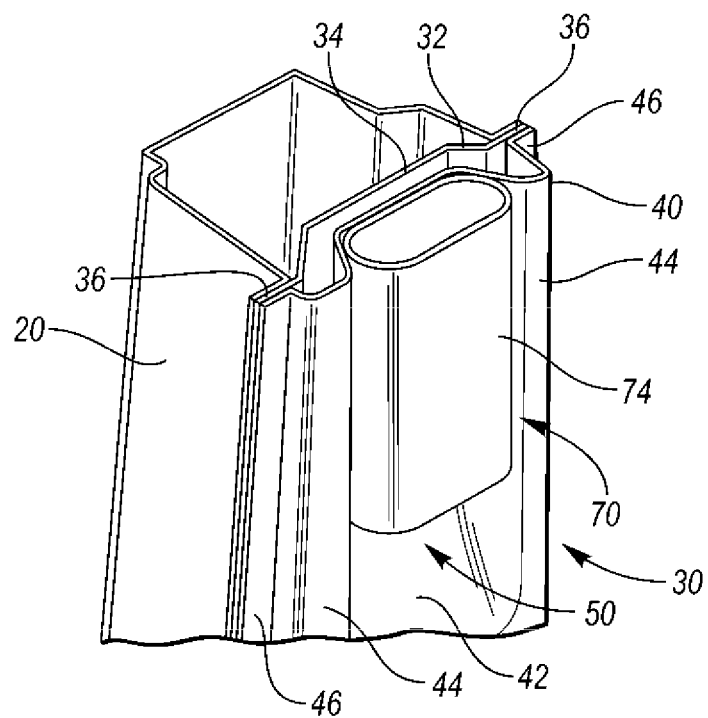
FIG. 2 is an enlarged perspective view of a portion of a roof pillar disposed in a pillar receptacle of a pillar.
Figure 3:
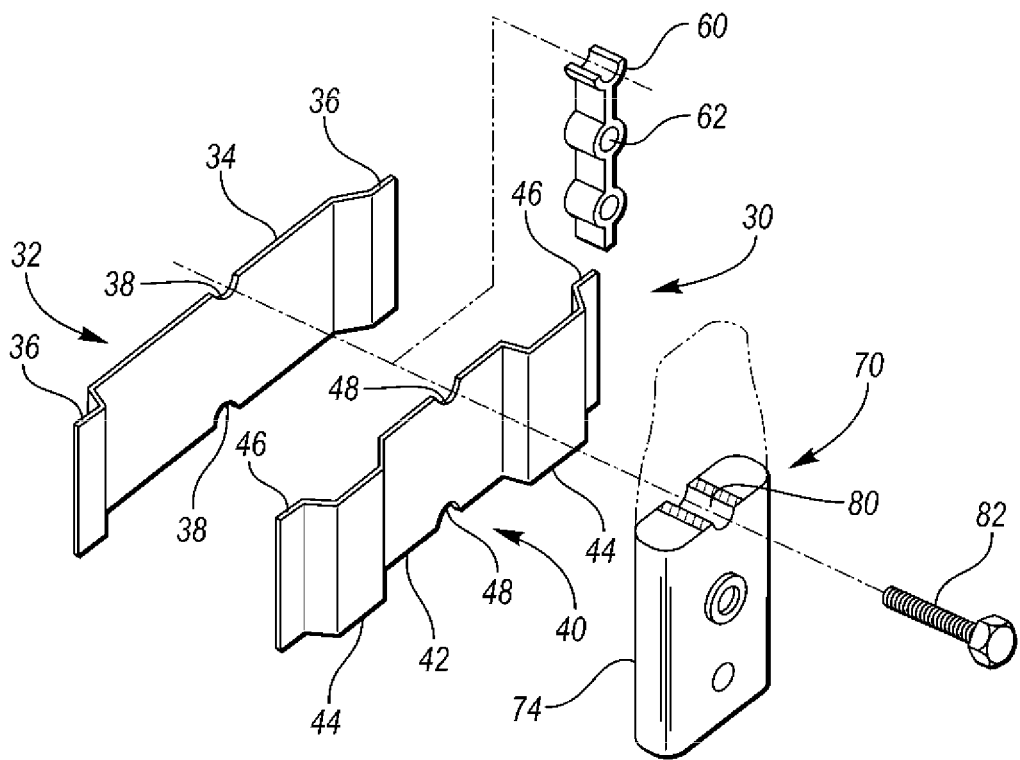
FIG. 3 is a mounting assembly.

As shown in greater detail in FIGS. 2 and 3, one or more pillars may include a pillar receptacle 30. The pillar receptacle 30 may include a pillar reinforcement 32. The pillar reinforcement 32 may include a central planar body 34 and opposing flanges 36 that extend in planes that may be parallel to and offset from a plane of the central planar body 34. As shown in FIG. 3, the pillar reinforcement 32 may include one or more apertures 38 that may extend, for example, through the central planar body 34. The apertures 38 may be circular apertures. The apertures 38 may be vertically aligned apertures such that individual centers of the apertures 38 may be disposed on a common (e.g., vertical) axis.

The pillar receptacle 30 may include a pillar insert 40. The pillar insert 40 may include a central planar body 42, ribs 44 that extend in planes that may be parallel to and offset from a plane of the central planar body 42, and distal flanges 36 that may be parallel to and offset from the plane of the ribs 44. Sidewalls extending from the central planar body 42 may define a cavity 50. As shown in FIG. 3, the pillar insert 40 may include one or more apertures 48 that may extend, for example, through the central planar body 42. The apertures 48 may be circular apertures. The apertures 48 may be vertically aligned apertures such that individual centers of the apertures 48 may be disposed on a common (e.g., vertical) axis.

The pillar insert 40 may be secured to the pillar reinforcement 32. For example, the distal flanges 36 of the pillar insert 40 may be secured to the opposing flanges 36 of the pillar receptacle 32. The pillar insert 40 may be secured to the pillar reinforcement 32 through one or more fasteners (e.g., mechanical fasteners), welds, etc.

In the assembled configuration, one or more of the apertures 48 of the pillar insert 40 may be aligned with one or more of the apertures 38 of the pillar reinforcement 32. For example, central axes of individual apertures 48 of the pillar insert 40 may be aligned with central axes of the apertures 38 of the pillar reinforcement 32.

In at least one approach, a fastener guide 60 may be disposed between the pillar reinforcement 32 and the pillar insert 40. The fastener guide 60 may include one or more apertures 62 that may extend through the fastener guide 60. In the assembled configuration, one or more of the apertures 62 of the fastener guide 60 may be aligned with one or more of the apertures 38 of the pillar reinforcement 32 and one or more apertures 48 of the pillar insert 40.

Referring to FIG. 4, the roof 14 may be a removable roof. The roof 14 may include one or more roof pillars 70 and a roof rail 72 extending between the roof pillars 70. A roof pillar 70 may include a first portion that may be an interface portion 74 and a second portion that may be an extension portion 76 that extends between the interface portion 74 to the roof rail 72. The interface portion 74 may be adapted (e.g., sized and shaped) such that it may be received within the pillar receptacle 30 of the body 12 of the vehicle 10. The interface portion 74 may define one or more apertures 80 that may extend through the interface portion 74. The apertures 80 may be vertically aligned apertures such that individual centers of the apertures 80 may be disposed on a common (e.g., vertical) axis.

A seatbelt positioner such as a seatbelt ring 84 may be secured to the roof pillars 70; for example, at the extension portion 76. The seatbelt ring 84 may be, for example, a D-ring. The seatbelt ring 84 may receive and guide belt webbing (e.g., from a belt retractor to a buckle). The seatbelt ring 84 may serve as an anchor structure, and may provide lateral movement of the belt webbing during attachment and detachment of a seatbelt.

In a first configuration of the vehicle 10, the roof 14 may be secured to the body 12. For example, a roof pillar 70 (and more particularly, an interface portion 74 of a roof pillar 70) may be disposed within the cavity 50 and in engagement with the central planar body 34 of the pillar reinforcement 32 of the pillar receptacle 30. The roof 14 may be removably secured to the pillars 20. For example, as shown in FIG. 3, one or more fasteners 82 may be used to secure the roof pillar 70 to a pillar receptacle 30 of a pillar 20. The fastener 82 may extend through axially aligned apertures 80, 48, 38 to secure the roof rail 72 to the pillar 20. In this configuration, the roof 14 (e.g., the roof pillar 70 and roof rail 72) extends a first vertical distance from the pillar 20. The first vertical distance may be a height such that the vehicle 10 can accommodate a passenger seated in the passenger compartment. A roof surface (e.g., fabric or one or more panels) may be disposed across the roof 14 to provide an enclosed passenger compartment.

In at least one approach, the vehicle 10 may be converted from the first configuration having an attached roof 14 to a second configuration in which the roof 14 has been removed. In the second configuration, the vehicle 10 may be provided with a removable seatbelt post 100. The seatbelt post 100 may include a vertical body portion 102 that may include a first portion 104 and a second portion 106.

The second portion 106 may be adapted (e.g., sized and shaped) such that it may be received within the pillar receptacle 30 of the body 12 of the vehicle 10. The second portion 106 may define one or more apertures 108 that may extend through the second portion 106. The apertures 108 may be vertically aligned apertures such that individual centers of the apertures 108 may be disposed on a common (e.g., vertical) axis. In at least one approach, the apertures 108 may be elongated apertures. For example, the apertures 108 may be oblong in shape (e.g., elongated rectangle or oval shaped).

A seatbelt positioner such as a seatbelt ring 110 may be secured to the seatbelt post 100; for example, at the first portion 104. The seatbelt ring 110 may be, for example, a D-ring. The seatbelt ring 110 may receive and guide belt webbing (e.g., guided from a belt retractor to a buckle). The seatbelt ring 110 may serve as an anchor structure, and may provide lateral movement of the belt webbing during attachment and detachment of a seatbelt.

The first portion 104 may extend along a first central axis 112, and the second portion 106 may extend along a second central axis 114. In at least one approach, the second central axis 114 is coaxial with the first central axis 112.

The first and second portions 104, 106 may have the same cross-sectional geometry, or may have different cross-sectional geometries. For example, referring to FIG. 6, the first portion 104 may define a first cross-sectional geometry that is circular, and the second portion 106 may define a second cross-sectional geometry that is non-circular. The second, non-circular geometry may include at least one planar surface. In this way, the second, non-circular geometry may be polygonal. As such, a planar surface of the second portion 106 may provide an engagement surface with the central planar body 34 of the pillar reinforcement 32 of the pillar receptacle 30.

In the second configuration of the vehicle 10, the seatbelt post 100 may be secured to the body 12. For example, the second portion 106 of the seatbelt post 100 may be disposed within the cavity 50 and in engagement with the central planar body 34 of the pillar reinforcement 32 of the pillar receptacle 30. The seatbelt post 100 may be removably secured to the pillars 20; for example, by using one or more fasteners. The fasteners may extend through axially aligned apertures 108, 48, 38 to secure the roof rail 72 to the pillar 20. In this configuration, the seatbelt post 100 extends a second vertical distance from the pillar 20. The height may be less than the first vertical distance and may correspond to webbing shoulder anchor height.

Figure 7:
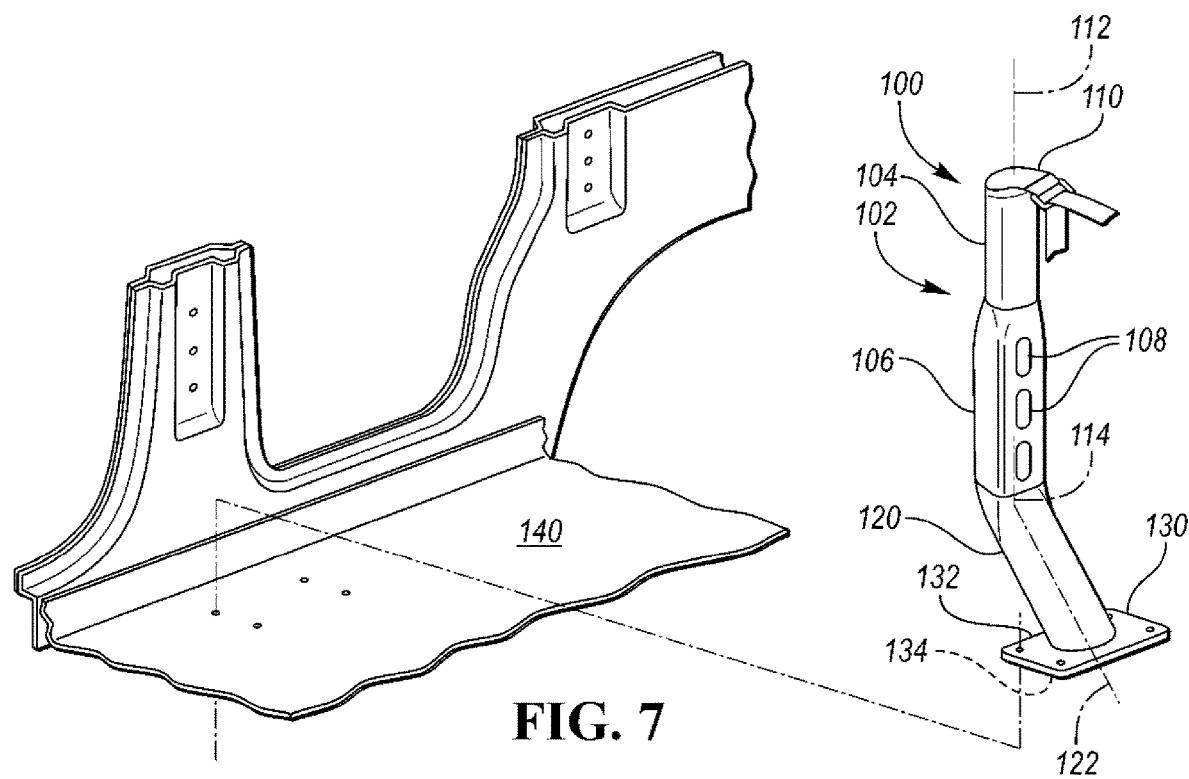
FIG. 7 is an enlarged and partially exploded perspective view of a portion of a vehicle having an alternative removable seatbelt post.

Referring to FIG. 7, the seatbelt post 100 may further include a third portion. The third portion may be a brace portion, and which may be referred to as a brace arm 120. The brace arm 120 may extend from the second portion 106 opposite the first portion 104. In this way, the seatbelt post 100 may define a top portion (e.g., first portion 104), a middle portion (e.g., second portion 106) that extends from the top portion, and a bottom portion (brace arm 120) that extends from the middle portion.

Figure 8:
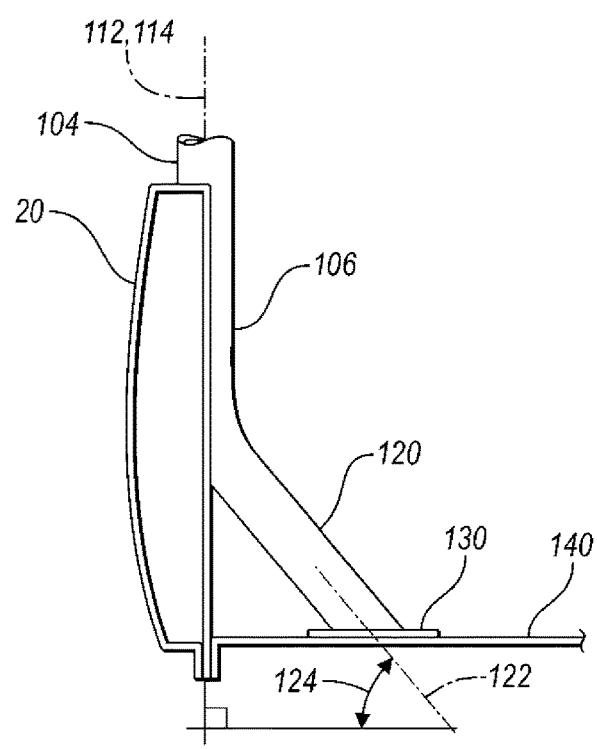
FIG. 8 is a side elevation view of the alternative removable seatbelt post in an assembled configuration.

In at least one approach, and referring momentarily to FIG. 8, the brace arm 120 may extend at an oblique angle 124 relative to the second portion. In this way, the brace arm 120 may define a third central axis 122 that may extend at an oblique angle 124 to the first central axis 112, the second central axis 114, or both the first and the second central axes 112, 114. The oblique angle 124 may be, for example, in the range of 15 degrees to 75 degrees, and more particularly, in the range of approximately 30 degrees to approximately 60 degrees, and more particularly, approximately 45 degrees (wherein "approximately" may refer to +/− five degrees).

The brace arm 120 may define a third cross-sectional geometry. In the approach shown, the third cross-sectional geometry that corresponds to the first cross-sectional geometry of the first portion 104. For instance, the third cross-sectional geometry may circular. A diameter of the brace arm 120 may corresponds to a diameter of the first portion 104. In still another approach, the third cross-sectional geometry may correspond to the second cross-sectional geometry of the second portion 106. In still another approach, the third cross-sectional geometry does not correspond to either the first cross-sectional geometry of the first portion 104 or the second cross-sectional geometry of the second portion 106.

The seatbelt post 100 may further include a mounting bracket 130. The mounting bracket 130 may be disposed at an end of the brace arm 120 opposite the second portion 106. The mounting bracket 130 may include a planar top surface 132 that interfaces the brace arm 120, and a planar bottom surface 134 extending parallel to the planar top surface 132. The mounting bracket 130, including the planar top surface 132 and the planar bottom surface 134, may extend in a plane that is generally orthogonal to the first and second central axes 112, 114.

The mounting bracket 130 may be removably secured to a floor 140 of the vehicle 10. More particularly, the planar bottom surface 134 may interface the floor 140 of the vehicle 10 in the second configuration. The mounting bracket 130 may include one or more apertures extending, for example, from the planar top surface 132 to the planar bottom surface 134. The apertures may be disposed in alignment with corresponding apertures disposed in the floor 140. In this way, one or more fasteners may be used to secure the mounting bracket 130 to the floor 140. In this configuration, the mounting bracket 130 may be spaced from the pillar 20.

In at least one approach, the seatbelt ring of the roof 14 and the seatbelt ring of the removable seatbelt post 100 may be discrete seatbelt rings. In still another approach, the seatbelt ring of the roof 14 and the seatbelt ring of the removable seatbelt post 100 may be the same seatbelt ring. In this way, a removable seatbelt ring may be provided. As such, a method of converting a vehicle may include detaching a seatbelt ring from a roof pillar (e.g., roof pillar 70) of a removable roof (e.g., roof 14). Detaching the seatbelt ring may include removing a fastener to detach the seatbelt ring from the roof pillar. The method may further include detaching the removable roof from a body pillar (e.g., pillar 20) of a vehicle body structure (e.g., body 12). In this way, the detached seatbelt ring may remain within the vehicle and may maintain the webbing. The method may further include securing a vertically-extending seatbelt post (e.g., removable seatbelt post 100) to the body pillar. The method may further include securing the seatbelt ring to the vertically-extending seatbelt post. The seatbelt ring may be secured to a distal end portion of the vertically-extending seatbelt post opposite the body pillar (e.g., at a distal end of first portion 104). In at least one approach, the seatbelt ring is secured to a horizontal top surface of the vertically-extending seatbelt post, as shown in FIG. 5. In still another approach, the seatbelt ring is secured to a vertical side surface of the vertically-extending seatbelt post.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    a plurality of pillars, an individual pillar defining a pillar receptacle;
    a removable roof having roof pillars, an individual roof pillar adapted to be received within and removably fastened to the pillar receptacle in a first configuration; and
    a removable seatbelt post including a first portion having a seatbelt ring, and a second portion adapted to be received within and removably fastened to the pillar receptacle in a second configuration.

2. The vehicle of claim 1 wherein the roof pillar extends to a first vertical height from the pillar in the first configuration, wherein the removable seatbelt post extends to a second vertical height from the pillar in the second configuration, and wherein the second vertical height is less than the first vertical height.

3. The vehicle of claim 1 wherein the pillar receptacle defines a first plurality of vertically aligned apertures, wherein the first portion includes a second plurality of vertically aligned apertures, and wherein the second plurality of vertically aligned apertures are disposed in alignment with the first plurality of vertically aligned apertures in the second configuration.

4. The vehicle of claim 3 wherein individual apertures of the first plurality of vertically aligned apertures are circular apertures, and wherein individual apertures of the second plurality of vertically aligned apertures are elongated apertures.

5. The vehicle of claim 1 wherein removable seatbelt post further includes a brace arm extending from the second portion opposite the first portion.

6. The vehicle of claim 5 wherein the brace arm extends at an oblique angle relative to the second portion.

7. The vehicle of claim 6 wherein removable seatbelt post further includes a mounting bracket disposed at an end of the brace arm opposite the second portion.

8. The vehicle of claim 7 wherein the mounting bracket is removably secured to a floor of the vehicle in the second configuration.

9. The vehicle of claim 8 wherein the mounting bracket is spaced from the pillar in the second configuration.

10. The vehicle of claim 8 wherein the mounting bracket includes a planar top surface that interfaces the brace arm, and a planar bottom surface extending parallel to the planar top surface and interfacing the floor of the vehicle.

11. A removable seatbelt post comprising:
- a top portion defining a first central axis and including a seatbelt ring;
- a middle portion extending from the top portion and defining a second central axis coaxial with the first central axis, and including vertically aligned apertures; and
- a bottom portion extending from the middle portion and defining a third central axis extending at an oblique angle to the second central axis, and including a mounting bracket secured thereto.

12. The removable seatbelt post of claim 11 wherein the top portion defines a first cross-sectional geometry, and wherein the middle portion defines a second cross-sectional geometry different than the first cross-sectional geometry.

13. The removable seatbelt post of claim 12 wherein the first cross-sectional geometry is circular, and wherein the second cross-sectional geometry is non-circular.

14. The removable seatbelt post of claim 12 wherein the bottom portion defines a third cross-sectional geometry that corresponds to the first cross-sectional geometry.

15. The removable seatbelt post of claim 14 wherein a diameter of the bottom portion corresponds to a diameter of the top portion.

16. The removable seatbelt post of claim 12 wherein the seatbelt ring is pivotably secured to the top portion.

17. The removable seatbelt post of claim 11 wherein the mounting bracket extends in a plane that is generally orthogonal to the first and second central axes.

18. A method of converting a vehicle, comprising:
- detaching a seatbelt ring from a roof pillar of a removable roof;
- detaching the removable roof from a body pillar of a vehicle body structure;
- securing a vertically-extending seatbelt post to the body pillar; and
- securing the seatbelt ring to the vertically-extending seatbelt post.

19. The method of claim 18 wherein securing the seatbelt ring to the vertically-extending seatbelt post includes rotatably securing the seatbelt ring to a distal end portion of the vertically-extending seatbelt post opposite the body pillar.

20. The method of claim 18 wherein securing the seatbelt ring to the vertically-extending seatbelt post includes securing the seatbelt ring to a horizontal top surface of the vertically-extending seatbelt post.

* * * * *